United States Patent
Provost

(10) Patent No.: US 8,543,844 B2
(45) Date of Patent: *Sep. 24, 2013

(54) INLINE POWER CONTROL

(75) Inventor: Jeffrey D. Provost, Campbell, CA (US)

(73) Assignee: Cisco Technology, Inc., San Jose, CA (US)

(*) Notice: Subject to any disclaimer, the term of this patent is extended or adjusted under 35 U.S.C. 154(b) by 297 days.

This patent is subject to a terminal disclaimer.

(21) Appl. No.: 12/608,754

(22) Filed: Oct. 29, 2009

(65) Prior Publication Data

US 2010/0042854 A1    Feb. 18, 2010

Related U.S. Application Data

(63) Continuation of application No. 10/618,211, filed on Jul. 11, 2003, now Pat. No. 7,613,933.

(51) Int. Cl.
*G06F 1/26* (2006.01)
*G06F 1/32* (2006.01)

(52) U.S. Cl.
USPC ........... 713/300; 713/320; 713/321; 713/340; 455/522; 455/574

(58) Field of Classification Search
USPC ................ 713/300, 320, 321, 340; 455/522, 455/574
See application file for complete search history.

(56) References Cited

U.S. PATENT DOCUMENTS

| | | | |
|---|---|---|---|
| 4,833,339 A | 5/1989 | Luchaco et al. | |
| 5,406,260 A | 4/1995 | Cummings et al. | |
| 5,640,573 A | 6/1997 | Gephardt et al. | |
| 5,923,663 A | 7/1999 | Bontemps et al. | |
| 6,218,930 B1 | 4/2001 | Katzenberg | |
| 6,535,983 B1 | 3/2003 | McCormack et al. | |
| 6,701,443 B1 | 3/2004 | Bell | |
| 6,762,675 B1 | 7/2004 | Cafiero et al. | |
| 6,874,093 B2 | 3/2005 | Bell | |
| 6,985,713 B2 | 1/2006 | Lehr et al. | |
| 7,103,319 B2 | 9/2006 | Cai et al. | |
| 7,203,851 B1 | 4/2007 | Lo et al. | |
| 7,613,933 B1 * | 11/2009 | Provost | 713/300 |
| 2004/0246030 A1 | 12/2004 | Yang | |

OTHER PUBLICATIONS

IEEE Draft P802.3af/D4.3, Apr. 2003, IEEE Standards Department, Draft Amendment 802-3-2002.

* cited by examiner

*Primary Examiner* — Kim Huynh
*Assistant Examiner* — Michael J Brown
(74) *Attorney, Agent, or Firm* — BainwoodHuang

(57) ABSTRACT

A physical layer for an inline power device of a network power system. The network power system includes inline power devices such as power source equipment and a plurality of powered devices and further includes a plurality of corresponding transmission media. The plurality of transmission media are connected to the corresponding power source equipment and powered devices through a power interface at each end of the transmission media. The multiple power interfaces of the power source equipment are often referred to as ports. For each port of the power source equipment and the plurality of powered devices, there exists a physical layer. The physical layer includes an inline power control signal source. The inline power control signal designates when to apply power to a port when there is no power applied to the port and when to remove power from the port when there is power applied to the port.

19 Claims, 2 Drawing Sheets

INLINE POWER CONTROL

CROSS REFERENCE TO RELATED APPLICATIONS

This Patent Application is a Continuation of U.S. patent application Ser. No. 10/618,211 filed on Jul. 11, 2003, entitled, "INLINE POWER CONTROL", the contents and teachings of which are hereby incorporated by reference in their entirety.

FIELD OF THE INVENTION

The present invention relates generally to a network power system including power source equipment, at least one powered device, and transmission media. More specifically, the present invention relates to power source equipment including at least one physical layer having inline power control.

BACKGROUND OF THE INVENTION

In the field of networks, there are instances when it is desired or required that data terminal equipment (DTE) be able to draw power from the same generic cabling as that used for data transmission. DTE devices may include telephones, Voice over Internet Protocol (VoIP or IP or Ethernet) telephones, network access devices, computers, and the like. Such a power scheme is known as inline or phantom power or power via a media dependent interface (MDI). Various example power via MDI schemes exist. These include a proprietary scheme from Cisco Systems Inc (Cisco) and a standard scheme from the Institute of Electrical and Electronics Engineers (IEEE). The proprietary scheme from Cisco will be referred to as Cisco legacy power. The IEEE scheme is known as IEEE 802.3af standard power and will be referred to as IEEE standard power. Although these two inline power schemes have some aspects in common, they are not entirely compatible with one another.

Turning first to FIG. 1, a schematic diagram of a network power system 10 having power source equipment (PSE) 12, a plurality of powered devices (PD) 14A-N, and a plurality of corresponding transmission media 16A-N is shown. The plurality of transmission media 16A-N are connected to the corresponding power source equipment 12 and powered devices 14A-N through a power interface at each end of the transmission media. Each transmission media may contain a plurality of conductors. For example, the current Ethernet standard is a minimum of two twisted-pair cables for a total of four conductors. The length and routing of the transmission media will depend on the circumstances and the applicable communications protocol. The number and location of each of the plurality of powered devices 14A-N will depend on the circumstances. The power source equipment 12 may also be variously located based on the circumstances. The power source equipment 12 may be at one end of the network or it might be somewhere between the ends of the network. The multiple power interfaces of the power source equipment 12 are often referred to as ports. The number of ports will vary. Typically, one port is connected to one powered device. However, it is also possible that multiple powered devices might be connected together to one port or multiple ports might be connected to one powered device. The multiple transmission media are often referred to as links between the power source equipment and the various powered devices. Each link includes at least two data and power signal paths with one for transmitting and one for receiving. In order for the network power system 10 to operate correctly, the power source equipment 12 and the plurality of powered devices 14A-N must be compatible with one another.

BRIEF DESCRIPTION OF THE INVENTION

A physical layer for an inline power device of a network power system is disclosed. The network power system includes inline power devices such as power source equipment and a plurality of powered devices and further includes a plurality of corresponding transmission media. The plurality of transmission media are connected to the corresponding power source equipment and powered devices through a power interface at each end of the transmission media. The multiple power interfaces of the power source equipment are often referred to as ports. For each port of the power source equipment and the plurality of powered devices, there exists a physical layer. The physical layer includes an inline power control signal source. The inline power control signal designates when to apply power to a port when there is no power applied to the port and when to remove power from the port when there is power applied to the port.

According to an embodiment, a physical layer for an inline power device of a network power system includes an inline power control signal source. The inline power control signal indicates when to apply power to a port when there is no power applied to the port and when to remove power from the port when there is power applied to the port.

According to another embodiment, a power source equipment of a network power system includes at least one physical layer including an inline power control signal source. The inline power control signal indicates when to apply power to a port when there is no power applied to the port and when to remove power from the port when there is power applied to the port. In some arrangements, the power source equipment further includes signal processing circuitry to signal process the inline power control signal. In these arrangements, the signal processing circuitry is preferably external to the physical layer.

According to another embodiment, a method of inline power for a network power system includes sourcing an inline power control signal from a physical layer, wherein the inline power control signal indicates when to apply power to a port when there is no power applied to the port and when to remove power from the port when there is power applied to the port.

According to yet another embodiment, an apparatus for inline power for a network power system includes a physical layer and means for sourcing an inline power control signal from the physical layer. The inline power control signal indicates when to apply power to a port when there is no power applied to the port and when to remove power from the port when there is power applied to the port.

According to still another embodiment, a physical layer for an inline power device of a network power system includes an inline power control signal source. The inline power control signal determines when to apply power to a port when there is no power applied to the port and when to remove power from the port when there is power applied to the port.

According to another embodiment, a power source equipment of a network power system includes at least one physical layer having an inline power control signal source. The inline power control signal determines when to apply power to a port when there is no power applied to the port and when to remove power from the port when there is power applied to the port. In some arrangements, the power source equipment further includes signal processing circuitry to signal process the inline power control signal. In these arrangements, the signal processing circuitry is preferably external to the physical layer.

According to yet another embodiment, a method of inline power for a network power system includes sourcing an inline power control signal from a physical layer, wherein the inline power control signal determines when to apply power to a port when there is no power applied to the port and when to remove power from the port when there is power applied to the port.

According to another embodiment, an apparatus for inline power for a network power system includes a physical layer and means for sourcing an inline power control signal from the physical layer. The inline power control signal determines when to apply power to a port when there is no power applied to the port and when to remove power from the port when there is power applied to the port.

According to still another embodiment, a network switch for a network power system includes at least one physical layer including an inline power control signal source. The inline power control signal determines when to apply power to a port when there is no power applied to the port and when to remove power from the port when there is power applied to the port.

BRIEF DESCRIPTION OF THE DRAWINGS

The accompanying drawings, which are incorporated into and constitute a part of this specification, illustrate one or more exemplary embodiments of the present invention and, together with the detailed description, serve to explain the principles and exemplary implementations of the invention.

In the drawings.

DETAILED DESCRIPTION OF THE INVENTION

Various exemplary embodiments of the present invention are described herein in the context of inline power control from a physical layer. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to exemplary implementations of the present invention as illustrated in the accompanying drawings. The same reference indicators will be used throughout the drawings and the following detailed descriptions to refer to the same or like parts.

In the interest of clarity, not all of the routine features of the exemplary implementations described herein are shown and described. It will of course, be appreciated that in the development of any such actual implementation, numerous implementation-specific decisions must be made in order to achieve the specific goals of the developer, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks (LANs), wide area networks (WANs), the Internet, cable television systems, telephone systems, wireless telecommunications systems, fiber optic networks, ATM networks, frame relay networks, satellite communications systems, and the like. Such networks are well known in the art and consequently are not further described herein.

Figure 1:
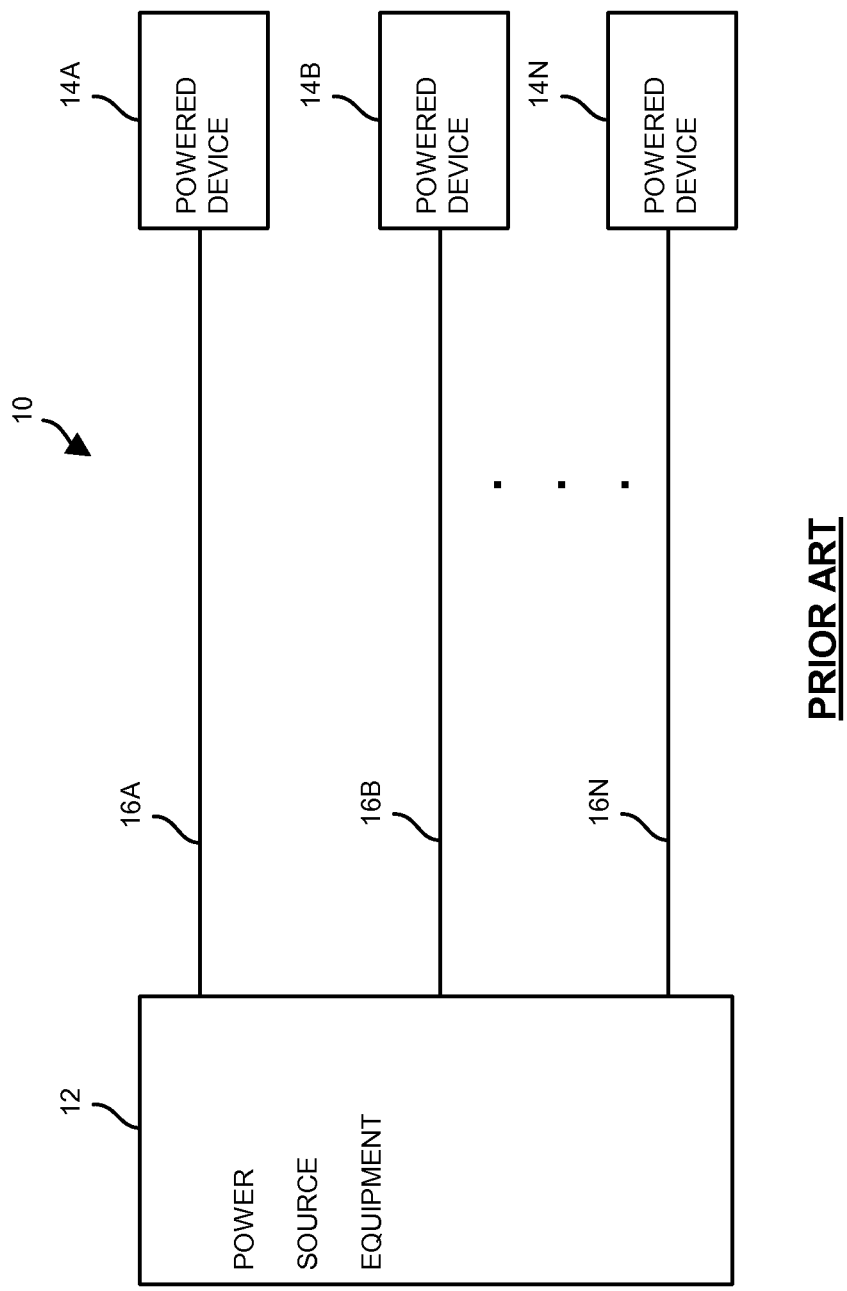
FIG. 1 is a schematic diagram of a network power system having power source equipment, a plurality of powered devices, and a plurality of corresponding transmission media.
Figure 2:
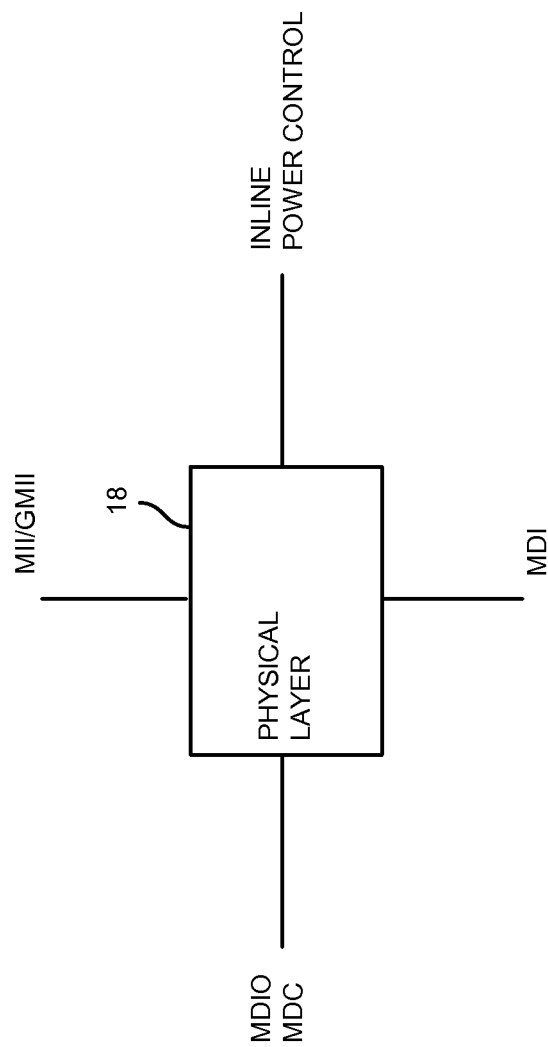
FIG. 2 is a block diagram of a physical layer according to the present invention.

Turning now to FIG. 2, a block diagram of a physical layer (PHY) 18 according to the present invention is shown. The block diagram has been simplified for greater clarity. Although not shown in FIG. 1, for each port of the power source equipment 12 and for each of the plurality of powered devices 14A-N there exists a physical layer 18. Various aspects of the physical layer are defined by an IEEE standard that is known as the IEEE 802.3 standard. The pertinent aspects of the IEEE 802.3 standard are well known to those of ordinary skill in the art and will not be presented in detail herein. IEEE standard power described above is a new portion of the larger IEEE 802.3 standard. The IEEE 802.3 standard does not exclude the addition of functions to the physical layer 18. Nevertheless, there is currently no direct requirement by IEEE standard power of the physical layer 18. Given the open standard and with respect to power source equipment, not all physical layers are entirely compatible with one another from device to device and from manufacturer to manufacturer. Generally, the physical layer 18 consists of a physical coding sublayer (PCS), a physical medium attachment (PMA), and optionally a physical medium dependent (PMD) sublayer. The physical layer 18 serves as a bridge between the MDI of the link and a media independent interface (MII) or a gigabit media independent interface (GMII), as the case may be, of the power source equipment 12 or the powered device 14A-N. The MII/GMII is connected to various components including a media access control (MAC) and a station management component. The station management component provides management data input/output (MDIO) and a management data clock (MDC) to the physical layer 18.

During data communication, a series of output data signals are generated and a series of input data signals are received. The signals may be simultaneous or alternating. From the perspective of the power source equipment 12 of FIG. 1, an output data signal is generated by the physical layer 18 of the power source equipment 12 for transmission to the physical layer of the powered device connected to the particular port. For example, the powered device might be the first powered device 14A that is connected to the power source equipment 12 by the first transmission media 16A of FIG. 1. An input data signal that is generated by the physical layer 18 of the powered device connected to the port is received by the power source equipment 12 and passed to the physical layer 18 of the power source equipment 12. From the perspective of the powered devices 14A-N, the roles are substantially reversed for input and output data communications.

In terms of inline power schemes, the power source equipment 12 of FIG. 1 performs many functions which may include searching the link for a powered device, supplying power to the link only if a powered device is detected, monitoring the power on the link, and removing power from the link when the powered device is disconnected.

Under IEEE standard power, the inline power over the link may include more than one power level. The power level supplied by the power source equipment 12 of FIG. 1 may depend in part on which classification of device the powered device is according to IEEE standard power. IEEE standard power has a number of power classes while Cisco legacy power does not. At this time, the classification of the powered devices is not strictly necessary. The option is left open for the future.

Under any of the inline power schemes, what will be referred to as an inline power control signal is composed at some instant within the power source equipment 12 of FIG. 1. A different signal is composed for each of the plurality of ports. Although the singular form of the word signal is used in describing the inline power control signal, it is possible that multiple signals may be used instead of just one. This signal may take many forms, but it is the essence of the many functions performed by the power source equipment 12, that is, apply power to the port when there is no power or remove power from the port when there is power. There would be benefits to having the physical layer 18 be the source of the inline power control signal. For example, in one embodiment a single pin could be the external output source of the signal. Depending on the circumstances, this signal might be used directly or it might require further signal processing external to the physical layer 18. Since the powered devices 14A-N of FIG. 1 are not supplying power, there is no comparable inline power control signal from the physical layer 18 of the powered devices 14A-N. This does not mean that the same physical layer is barred from use in both the power source equipment 12 and the powered devices 14A-N. It just means that in the powered devices 14A-N, the inline power control signal capability would remain unexploited at this time. A unified source of the inline power control signal would enable enhanced inline power scheme implementation.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A physical layer (PHY) of an inline power device of a network power system, inline power device including a media access control component connected to a media independent interface for sending and receiving data over a physical transmission link attached to a port of the inline power device, the PHY comprising:
    a set of external connection terminals including first signal terminals for connecting the PHY to the media independent interface of the inline power device, second terminals for connecting the PHY to a media dependent interface to the physical transmission link, and one or more third terminals carrying an inline power control signal;
    PHY sublayer circuitry constructed and arranged as a bridge between the media independent interface and the media dependent interface to provide for the exchange of data communications signals between the media access control component and an external device through the port of the inline power device; and
    an inline power control signal source coupled to the PHY sublayer circuitry and constructed and arranged to output the inline power control signal on the one or more third terminals, the inline power control signal being configured to control inline power, including (i) to supply power to the external device through the port when the external device is coupled to the port and (ii) to remove power from the port when the external device is decoupled from the port.

2. The PHY as recited in claim 1, further comprising an output terminal of the PHY, coupled to the inline power control signal source, the output terminal being constructed and arranged to output the inline power control signal from the inline power control signal source to a power supply of the inline power device, wherein the power supply is configured to deliver power to the external device through the port.

3. The PHY as recited in claim 1, wherein the inline power control signal source is constructed and arranged to output a plurality of inline power control signals.

4. The PHY as recited in claim 3, wherein each of the plurality of inline power control signals is configured for controlling power applied to a different external device through a different port of the inline power device.

5. The PHY as recited in claim 1, wherein the inline power control signal is provided in the form or a plurality of electrical signals and the inline power control signal source has a plurality of output contacts to provide the plurality of electrical signals of the inline power control signal.

6. The PHY as recited in claim 1, wherein the PHY sublayer circuitry comprises at least one of a physical coding sublayer (PCS) and a physical medium attachment (PMA).

7. An apparatus for connecting to a network power system, the apparatus comprising:
    a media access control component connected to a media independent interface for sending and receiving data over a physical transmission link attached to a port of the apparatus, the port constructed and arranged to couple said apparatus to a network device and to pass data and power therebetween; and
    a physical layer (PHY) having a set of external connection terminals including first signal terminals for connecting the PHY to the media independent interface, second terminals for connecting the PHY to a media dependent interface to the physical transmission link, and one or more third terminals carrying an inline power control signal, the PHY being constructed and arranged as a bridge between the media independent interface and the media dependent interface to provide for the exchange of data signals between the media access control component and said network device via said port, the PHY including an inline power control signal source providing the inline power control signal on the one or more third terminals to control power applied to said port for powering said network device.

8. The apparatus as recited in claim 7, wherein the inline power control signal is configured indicate when to apply power to a port when there is no power applied to the port and when to remove power from the port when there is power applied to the port.

9. The apparatus as recited in claim 8, wherein the one or more third terminals comprises a single pin to output the inline power control signal.

10. The apparatus as recited in claim 7, wherein the inline power control signal source is constructed and arranged to generate a plurality of inline power control signals.

11. The apparatus as recited in claim 7, wherein the apparatus comprises power source equipment and wherein the port is one of a plurality of ports for constructed and arranged to couple the power source equipment to a plurality of network devices.

12. The apparatus as recited in claim 11, wherein the inline power control signal source is constructed and arranged to output a different inline power control signal for each of the plurality of ports.

13. The apparatus as recited in claim 12, wherein each of the different inline power control signals controls power applied to its respective port.

14. The apparatus as recited in claim 7, wherein the apparatus comprises a powered device.

15. The apparatus as recited in claim 7, wherein the apparatus comprises a network switch.

16. A method of controlling inline power in a network power system, the method comprising:

providing a first network device having a port, a physical layer (PHY) coupled to the port, and a media access control component connected to a media independent interface for sending and receiving data over a physical transmission link attached to the port, wherein the PHY includes (i) a set of external connection terminals including first signal terminals for connecting the PHY to the media independent interface, second terminals for connecting the PHY to a media dependent interface to the physical transmission link, and one or more third terminals carrying an inline power control signal, and (ii) PHY sublayer circuitry constructed and arranged as a bridge between the media independent interface and the media dependent interface to provide for the exchange of data communications signals between the media access control component and a second network device coupled to the port of the first network device;

sourcing the inline power control signal from the PHY;

applying power to the second network device in response to the inline power control signal sourced from the PHY;

outputting data signals from the PHY; and transmitting the data signals through the port to the second network device.

17. The method as recited in claim 16, further comprising removing power from the second network device in response to the inline power control signal sourced from the PHY.

18. The method as recited in claim 16, wherein:

the first network device has a plurality of ports coupled to a plurality of network devices, the sourcing step comprises sourcing a plurality of inline power control signals from the PHY, and the applying step comprises applying power to the plurality of network devices through the plurality of ports in response to the plurality of inline power control signals.

19. The method as recited in claim 18, wherein the step of applying power further comprises each of the plurality of inline power control signals controlling power applied to a different one of the plurality of network devices.

* * * * *